US008137719B2

(12) United States Patent  
Bevans et al.

(10) Patent No.: US 8,137,719 B2
(45) Date of Patent: Mar. 20, 2012

(54) HIGH-FAT ANIMAL FEED PELLETS AND METHOD FOR MAKING SAME

(75) Inventors: Basil D. Bevans, Quincy, IL (US); Lawrence Dwain Bunting, Quincy, IL (US); Dan S. Hickman, Payson, IL (US)

(73) Assignee: ADM Alliance Nutrition, Inc., Decatur, IL (US)

( * ) Notice: Subject to any disclaimer, the term of this patent is extended or adjusted under 35 U.S.C. 154(b) by 931 days.

(21) Appl. No.: 11/176,814

(22) Filed: Jul. 7, 2005

(65) Prior Publication Data

US 2006/0045957 A1  Mar. 2, 2006

Related U.S. Application Data

(60) Provisional application No. 60/604,905, filed on Aug. 27, 2004.

(51) Int. Cl.
 *A23K 1/18* (2006.01)
 *A23K 1/175* (2006.01)
(52) U.S. Cl. ........... 426/72; 426/601; 426/656; 426/807
(58) Field of Classification Search .................. 426/601, 426/807, 72, 656
 See application file for complete search history.

(56) References Cited

U.S. PATENT DOCUMENTS

| | | | | |
|---|---|---|---|---|
| 2,168,532 A | * | 8/1939 | Mcmath et al. | ............... 426/542 |
| 3,959,493 A | * | 5/1976 | Baalsrud et al. | ................... 426/2 |
| 4,642,317 A | | 2/1987 | Palmquist et al. | |
| 4,696,914 A | * | 9/1987 | Russe et al. | ..................... 514/9.8 |
| 4,804,547 A | * | 2/1989 | Vanderbilt et al. | ............. 426/74 |
| 4,826,694 A | | 5/1989 | McAskie | |
| 4,853,233 A | | 8/1989 | McAskie | |
| 4,909,138 A | | 3/1990 | McAskie | |
| 5,028,486 A | * | 7/1991 | Dunski | ........................ 428/402 |
| 5,093,128 A | | 3/1992 | Draguesku et al. | |
| 5,132,123 A | * | 7/1992 | Laiho et al. | ..................... 426/74 |
| 5,182,126 A | | 1/1993 | Vinci et al. | |
| 5,191,097 A | | 3/1993 | Dynes et al. | |
| 5,211,980 A | * | 5/1993 | Cox | ............................. 426/601 |
| 5,212,325 A | | 5/1993 | Lajoie | |
| 5,215,768 A | | 6/1993 | Vinci et al. | |
| 5,221,544 A | | 6/1993 | Sweeney et al. | |
| 5,234,701 A | | 8/1993 | Cummings et al. | |
| 5,236,717 A | | 8/1993 | Vinci | |
| 5,236,723 A | | 8/1993 | Lajoie et al. | |
| 5,244,681 A | | 9/1993 | Vinci et al. | |
| 5,250,307 A | | 10/1993 | Cummings et al. | |
| 5,250,714 A | | 10/1993 | Lajoie | |
| 5,285,681 A | * | 2/1994 | Binder et al. | ..................... 73/78 |
| 5,292,657 A | * | 3/1994 | Rutherford et al. | ........... 435/243 |
| 5,380,893 A | | 1/1995 | Lajoie | |
| 5,382,678 A | | 1/1995 | Vinci et al. | |
| 5,391,787 A | | 2/1995 | Vinci et al. | |
| 5,391,788 A | | 2/1995 | Vinci et al. | |
| 5,416,115 A | | 5/1995 | Erdman et al. | |
| 5,425,963 A | * | 6/1995 | Lajoie | ............................... 426/2 |
| 5,456,927 A | | 10/1995 | Vinci et al. | |
| RE35,162 E | | 2/1996 | Draguesku et al. | |
| 5,496,572 A | | 3/1996 | Rudden | |
| 5,532,008 A | * | 7/1996 | Sasaoka et al. | ................. 426/73 |
| 5,670,191 A | | 9/1997 | Cummings et al. | |
| 5,849,348 A | | 12/1998 | Vinci et al. | |
| 5,871,802 A | | 2/1999 | Gao et al. | |
| 5,874,102 A | | 2/1999 | LaJoie et al. | |
| 6,083,520 A | | 7/2000 | Toneby | |
| 6,229,031 B1 | | 5/2001 | Strohmaier et al. | |
| 6,355,281 B1 | | 3/2002 | Cerchiari et al. | |
| 6,392,075 B1 | | 5/2002 | Strohmaier et al. | |
| 6,403,143 B1 | | 6/2002 | Bevans et al. | |
| 6,521,249 B2 | | 2/2003 | Block et al. | |
| 6,559,324 B2 | | 5/2003 | Strohmaier et al. | |
| 6,569,444 B2 | * | 5/2003 | Summer | ....................... 424/438 |
| 6,576,667 B2 | | 6/2003 | Strohmaier et al. | |
| 6,596,768 B2 | | 7/2003 | Block et al. | |
| 2002/0127259 A1 | * | 9/2002 | Orthoefer | ...................... 424/409 |
| 2002/0137958 A1 | | 9/2002 | Strohmaier et al. | |
| 2003/0007998 A1 | | 1/2003 | Block et al. | |
| 2003/0030028 A1 | | 2/2003 | Nakata | |
| 2003/0130348 A1 | | 7/2003 | Strohmaier et al. | |
| 2003/0170371 A1 | * | 9/2003 | Jobe et al. | ..................... 426/635 |

FOREIGN PATENT DOCUMENTS

| | | |
|---|---|---|
| CA | 1154 294 | 3/1980 |
| EP | 0 037 478 | 3/1980 |
| EP | 0 369 971 B1 | 1/1996 |
| EP | 0 163 395 B2 | 12/1997 |
| EP | 0 619 706 B1 | 11/1999 |
| EP | 1 169 924 A1 | 1/2002 |
| EP | 1 304 369 A1 | 4/2003 |
| GB | 2 157 147 | 10/1985 |

(Continued)

OTHER PUBLICATIONS

American Society of Agricultural Engineers (ASAE) Standard ASAE S269.4 DEC01, "Cubes, Pellets, and Crumbles—Definitions and Methods for Determining Density, Durability, and Moisture Content," pp. 567-569, 2003.
Mommer, R.P. Jr and Mommer, Daniel J., "A Guide to Feed Pelleting Technology," Uniscope, Inc., Johnstown, Colorado, USA, pp. 1-21, 2002.
Robert D. Vold et al, Polymorphic Transformations of Calcium Stearate and Calcium Stearate Monohydrate, Contribution from the Chemistry Department, University of Souther California, LA, Jan. 12, 1948, pp. 339-361.
Marjorie J. Vold et al, Crystal Forms of Anhydrous Calcium Stearate Derivable from Calcium Stearate Monohydrate, Contribution from the Chemistry Department, University of Souther California, LA, Dec. 27, 1948, pp. 93-101.

(Continued)

*Primary Examiner* — Chhaya Sayala
(74) *Attorney, Agent, or Firm* — Andrew F. Nilles

(57) ABSTRACT

A method is provided for producing animal feed pellets that are made entirely or predominantly of fat. Fats, oils, and waxes with complimentary physical properties also can be included, as can nutrients. Cohesive pellets of high flowability and durability are achieved. The superior handling quality of the pellets allows for their use in further formulation of animal feeds, where homogeneous distribution of nutrients throughout the final feed mix is desired.

17 Claims, 1 Drawing Sheet

FOREIGN PATENT DOCUMENTS

| | | | |
|---|---|---|---|
| JP | 01131651 A | * | 5/1989 |
| JP | 02238854 A | * | 9/1990 |
| WO | WO 93/06077 | | 4/1993 |
| WO | WO 93/10668 | | 6/1993 |
| WO | WO 93/10669 | | 6/1993 |
| WO | WO 93/10670 | | 6/1993 |
| WO | WO 93/10671 | | 6/1993 |
| WO | WO 93/10672 | | 6/1993 |
| WO | WO 93/18664 | | 9/1993 |
| WO | WO 93/18665 | | 9/1993 |
| WO | WO 93/18667 | | 9/1993 |
| WO | WO 94/02028 | | 2/1994 |
| WO | WO 94/28739 | | 12/1994 |
| WO | WO 95/12987 | | 5/1995 |
| WO | WO 9809538 A1 | * | 3/1998 |
| WO | WO 00/67589 | | 11/2000 |

OTHER PUBLICATIONS

Marjorie J. Vold et al, A Comparative Study of the X-ray Diffraction Patterns and Thermal Transitions of Metal Soaps, Journal of the American Oil Chemists' Society, Oct. 1949, pp. 520-525.

* cited by examiner

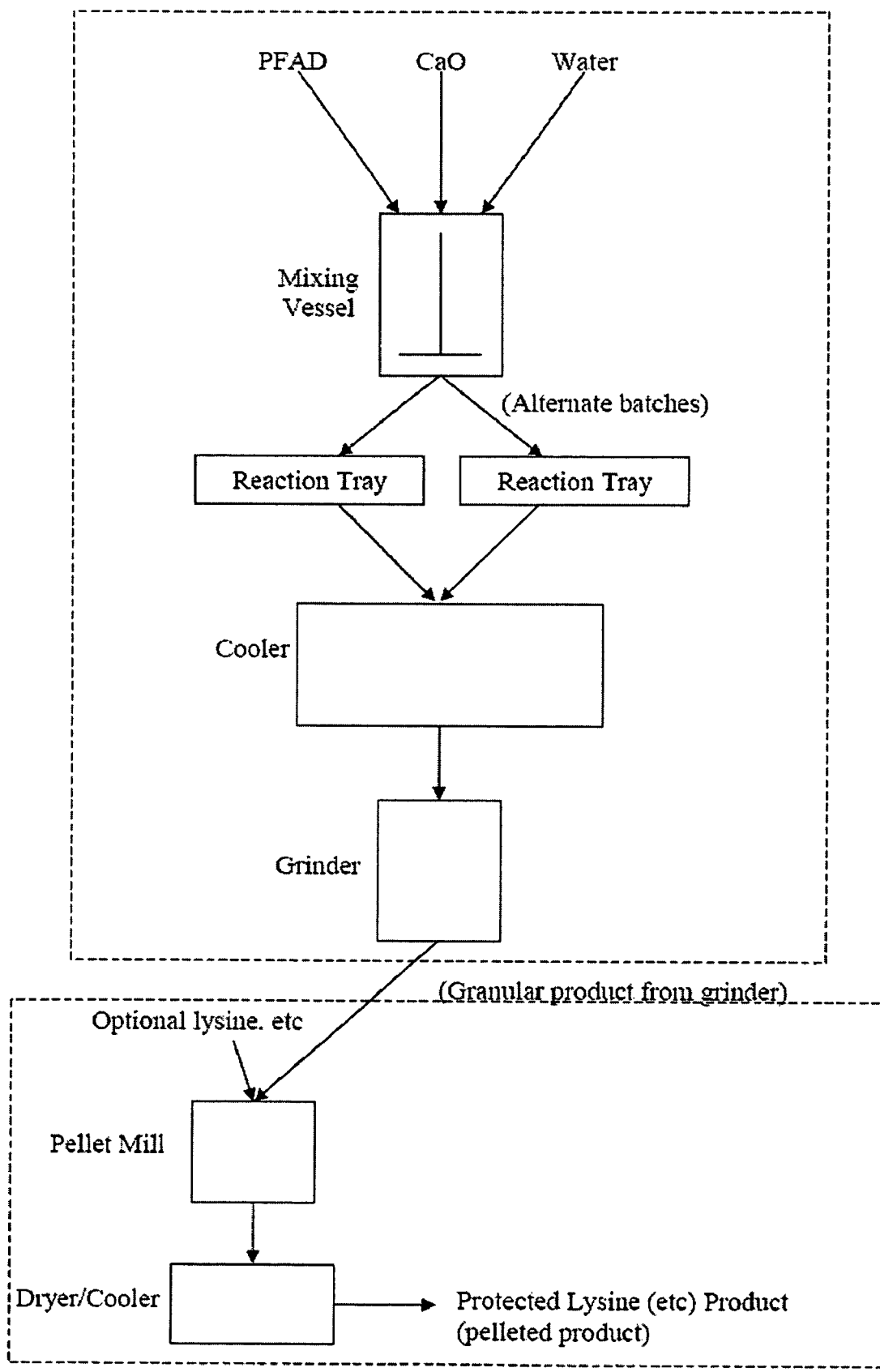

HIGH-FAT ANIMAL FEED PELLETS AND METHOD FOR MAKING SAME

RELATED APPLICATION

This application claims the benefit of U.S. Provisional Application No. 60/604,905, filed on Aug. 27, 2004. The entire teachings of the above application are incorporated herein by reference.

FIELD OF THE INVENTION

The present invention relates to a process for making high-fat content pellets for use in animal feed, and the pellets made by the process. In particular, the invention pertains to pellets produced without the use of steam conditioning, and comprising calcium salt of fatty acid, and an optional liquefiable conditioner. The pellets also can include nutrients.

BACKGROUND

Pelleting was introduced into the United States animal feed industry in the mid-1920's to improve feed utilization, increase the density of the feed and improve handling characteristics. Prior to about 1930 several different types of pelleting machines were utilized. Toward the end of the 1920's the so-called "flat die" pelleting machine and "ring die" pellet mill were developed in some of their early forms. While the flat die pelleting machine is still used for certain applications, the ring die pellet mill quickly became the preferred design and was rapidly adopted by the animal feed industry. It remains the type of pelleting machine of choice today. In addition to the ring die pellet mill itself, auxiliary equipment was developed including conditioners, cooler/dryers, and related process equipment.

Early pelleting processes involved mixing the feed ingredients into a mixture (a "mash") and pelleting them with no further treatment. The rationale for this approach was to prevent modification or breakdown of vitamins and proteins due to the addition of heat to the feed mix. In the late 1930's some processors began subjecting animal feed mixes to water and steam by passing the mixtures through a conditioner prior to their introduction into the pellet extruders. The addition of steam during the conditioning improved production rates, reduced die wear, and improved pellet quality. Steam conditioning was quickly adopted by the industry and has remained an integral part of the pelleting process to the present time. In the conditioning step, live steam is injected into the mash as it is conveyed through the conditioner which generally consists of a cylindrical tube with a rotating shaft upon which numerous paddles or picks are mounted. The condensing steam increases the temperature and moisture content of the mash.

Adding fat to the diet of a ruminant may adversely affect the normal rumen fermentation process, and can prevent the normal breakdown of cellulosic material in the ruminant forestomach. However, adding fat to the ruminant diet can increase milk production.

Because fat is subject to melting and is not miscible with the water introduced as steam in the conditioning process, fat is generally considered to be harmful to the formation of a cohesive animal feed pellet. Accordingly, it is routine practice to limit the amount of fat included in feed pellets. In general, fat contents below 2 percent have little effect on the durability of the pellets. As the level increases above 2 percent, the pellets become increasingly softer, more mealy, and break apart more readily during handling. To manufacture pellets with a fat content above 2%, industry recommendations are to manufacture the pellets with up to 2% fat, and spray the remainder of the oil onto the finished pellets (Mommer et al., "A Guide to Feed Pelleting Technology," Uniscope, Inc., Johnstown, Colo., USA, 2002).

Calcium salts of fatty acids were developed to overcome the problems associated with the decrease in rumen fermentation experienced when increasing levels of fats were added to ruminant rations. Calcium salts fatty acids are inherently less soluble in the rumen than conventional fats. Unfortunately, the calcium salts are slightly bitter and are considered less palatable than other fats when the calcium salts are fed in a loose or meal form. The calcium salts of fatty acids are granular products with a wide range of particle sizes, making it difficult to get them incorporated uniformly into a feed mix. Pelleting these products is generally believed to be impractical due to the high fat level in the products.

SUMMARY OF THE INVENTION

Methods are provided for making high-fat pellets for use in ruminant feed. The pellets comprise dry calcium salt of fatty acid and an optional liquefiable conditioner. The pellets also can comprise one or more nutrients. The mixture comprising the calcium salt of fatty acid, optional liquefiable conditioner, and optional nutrient(s) is pelleted without the use of steam conditioning. Pellets made by the methods also are provided. The pellets are cohesive and durable, which is unexpected given their high fat content.

A method is provided for making a high-fat pellet suitable for use in ruminant feed. The method includes pelleting calcium salts of fatty acids without steam conditioning. Another method includes combining calcium salts of fatty acids, a liquefiable conditioner, and a nutrient to form a mixture, and then pelleting the mixture without steam conditioning.

Another method is provided for making a high-fat pellet suitable for use in ruminant feed, and includes combining the ingredients comprising calcium salt of fatty acid and liquefiable conditioner to form a substantially uniform mixture, and pelleting the mixture without steam conditioning. The amount of calcium salt of fatty acid can be between about 50% and about 99% by weight of the mixture (for example and without limitation, about 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or 99% of the mixture). The amount of liquefiable conditioner can be between about 1% and about 5% by weight of the mixture (for example and without limitation, about 1%, 2%, 3%, 4%, or 5% of the mixture). For instance, the mixture can contain about 99% calcium salt of fatty acid, and about 1% liquefiable conditioner.

The pellets also can include an amino acid. A method for making a high-fat pellet that includes an amino acid, which is suitable for use in ruminant feed, includes combining the ingredients comprising the amino acid, calcium salt of fatty acid and liquefiable conditioner to form a substantially uniform mixture, and pelleting the mixture without steam conditioning. The amount of calcium salt of fatty acid can be between about 71% and about 84% by weight of the mixture (for example and without limitation, about 71%, 72%, 73%, 74%, 75%, 76%, 77%, 78%, 79%, 80%, 81%, 82%, 83% or 84% of the mixture), or more. The amount of liquefiable conditioner can be between about 1% and about 4% by weight of the mixture (for example and without limitation, about 1%, 2%, 3%, or 4% of the mixture). The amount of amino acid can be between about 15% and about 25% by weight of the mixture (for example and without limitation, about 15%, 16%, 17%, 18%, 19%, 20%, 21%, 22%, 23%, 24%, or 25% of the mixture).

The pellets also can include a vitamin. A method for making a high-fat pellet that includes a vitamin, which is suitable for use in ruminant feed, includes combining the ingredients comprising the vitamin, calcium salt of fatty acid and liquefiable conditioner to form a substantially uniform mixture, and pelleting the mixture without steam conditioning. The amount of calcium salt of fatty acid can be between about 86% and about 98% by weight of the mixture (for example and without limitation, about 86%, 87%, 88%, 89%, 90%, 91%, 92%, 93%, 94%, 95%, 96%, 97%, or 98% of the mixture). The amount of liquefiable conditioner can be between about 1% and about 4% by weight of the mixture (for example and without limitation, about 1%, 2%, 3%, or 4% of the mixture). The amount of vitamin can be between about 1% and about 10% by weight of the mixture (for example and without limitation, about 1%, 2%, 3%, 4%, 5%, 6%, 7%, 8%, 9%, or 10% of the mixture).

In the methods disclosed herein, the liquefiable conditioner can be an oil, a fat, a free fatty acid, a lipid, or mixtures of these. The liquefiable conditioner can be lecithin. It can also be a vegetable oil or a mixture of vegetable oils, such as, without limitation, soy, canola, pea, wheat, potato, corn, sesame, sunflower, cottonseed, copra, palm kernel, safflower, linseed, peanut, lupin, olive, edible bean and oat oil. The liquefiable conditioner can also be a wax, or a mixture of waxes. It can also be a mixture of a wax and one or more of an oil, a fat, a free fatty acid, or a lipid. The liquefiable conditioner can be petrolatum.

In the methods disclosed herein, a nutrient or nutritional aid can also be added to the mixture. The nutrient or nutritional aid can be an amino acid, a vitamin, a mineral, a commercial growth promotant (such as, but not limited to, ionophores (e.g., monensin (e.g., Rumensin™ (Elanco Animal Health, a Division of Eli Lilly and Co.)), lasalocid (e.g., Bovatec™ (Alpharma, Inc.)), salinomycin (Intervet, Inc.), and narasin (Elanco Animal Health, a Division of Eli Lilly and Co.)), an enzyme, a direct-fed microbial, a fermentation coproduct or byproduct, a plant extract or a botanical. An amino acid can be included in the mixture. The amino acid can be lysine. The nutrient can also be a vitamin, such as, without limitation, calcium pantothenate.

Pellets made by any of the methods described herein also are provided. The pellets can include about 50% to about 99% by weight calcium salts of a fatty acid, and about 1% to about 5% by weight of a liquefiable conditioner.

Preferably, the pellets made by the methods disclosed herein have a pellet durability index (PDI) of greater than about 80 percent, and wherein the PDI is determined by American Society of Agricultural Engineers Standard S269.4 (2003). Preferably, for pellets containing amino acids, greater than 20% (e.g., greater than about 20%, greater than about 30%, greater than about 40%, greater than about 50%, greater than about 60%) of the amino acid within the pellet remains in the gut of a ruminant animal four hours after the animal has ingested the pellets.

BRIEF DESCRIPTION OF THE DRAWINGS

FIG. 1 is a flow chart diagramming a batching, mixing, and pelleting process.

DETAILED DESCRIPTION

High-fat animal feed pellets are provided, and methods for making them. The pellets also can include added nutrients. The method does not use steam to condition the mash. The process includes mixing ingredients comprising calcium salt of fatty acid and an optional liquefiable conditioner, and optionally one or more nutrients, then pelleting the mixture, for example, and without limitation, in a ring die pellet mill. The process allows the production of cohesive, durable pellets that can be used to deliver nutrients that would normally be broken down by the heat treatment during conventional pelleting methods. The pellets also are resistant to breakdown in the ruminant forestomach, allowing slow delivery of the nutrients, and delivery of nutrients to the later portions of the ruminant digestive tract downstream of the forestomach.

The present invention departs from current pelleting processes by eliminating the conventional steam conditioning step. In certain embodiments, the present invention employs fat sources with unique chemistries and physical attributes to create a predominantly fat mash that readily flows through the ring die pellet extruder with comparatively low friction and at a low temperature compared with the conventional pelleting processes that utilize steam, and must therefore use relatively low fat mash. In certain embodiments, dry salt of fatty acid is mixed with a liquefiable conditioner, for example, and without limitation, fats, oils, lipids, waxes, etc. of varying melting points, to produce a predominantly fat mash that is pelleted as-is or is mixed with varying levels of other nutritive materials to produce fortified fat pellets. The predominately fat mash is compressed through the die and the particles are compacted and bound together to form pellets having a high durability index and a reduced level of fines. The dry salt of fatty acid is used to provide a compressible base material for compaction and cohesion of the pellet. A liquefiable conditioner is used for agglomerating the dry fatty acids salt and any other nutritive materials that may be incorporated into the mash. In addition, a liquefiable conditioner provides lubrication for the mash as it passes through the ring die pellet extruder which increases throughput and reduces the frictional heat produced.

By "calcium salt of fatty acid" is meant the product of a reactive mixture of calcium oxide, fatty acid distillate and water. Methods for making such mixtures are well known and are described in, for example and without limitation, U.S. Pat. No. 4,853,233. In general, fatty acids are heated, mixed with lime, and then water is added. The calcium salt of fatty acid is formed during the resulting exothermic reaction.

The calcium salt of fatty acid can be calcium salt of any fatty acid that can be used in animal feed and is crystalline in nature. Non-limiting examples include saturated or unsaturated fatty acids such as stearic acid, myristic acid, palmitic acid, oleic acid, linoleic acid, linolenic acid, or palm oil. The fatty acids can be obtained as by-products of edible oil refining, and can include a proportion of the corresponding triglycerides. The fatty acids also can be derived from animal fats, such as beef tallow, mutton tallow or lard. The fatty acids used can be a mixture of fatty acids from different sources, such as from a mixture of vegetable sources, a mixture of animal sources, or both animal and vegetable sources. The term "calcium salt of fatty acid" is therefore intended to include calcium salts of a single type of fatty acid, and also the calcium salts of multiple different fatty acids.

The choice of fatty acids used in preparation of the calcium salt of fatty acid can be dictated by practical, economic and/or legal considerations. For example, cost and availability often dictate which fatty acids are chosen for making the calcium salt of fatty acid. As another example, it may be preferable that none of the ingredients used in making the pellets are animal-based, including the fatty acids used to make the calcium salt of fatty acid.

By "liquefiable conditioner" is meant an oil, fat, free fatty acid, lipid, wax or a mixture of two or more of these. The conditioner must be liquefiable, that is, it must be liquid at room temperature or have a melting point below about 80° C. Non-limiting examples of liquefiable conditioners include, without limitation, vegetable oils (for example, and without limitation, soy, canola, pea, wheat, potato, corn, sesame, sunflower, cottonseed, copra, palm kernel, safflower, linseed, peanut, lupin, olive, edible bean and oat oil), fats (for example, and without limitation, choice white grease, tallow, hydrogenated vegetable oils), lipids (for example, and without limitation, soap stock and lecithin), waxes (for example, and without limitation, carnauba wax, beeswax, petrolatum, paraffin and oilseed-based waxes (for example, and without limitation, soy, canola, pea, wheat, potato, corn, sesame, sunflower, cottonseed, copra, palm kernel, safflower, linseed, peanut, lupin, olive, edible bean and oat oil)), and mixtures of these.

By "nutrient" is meant a nutritive substance or an ingredient that furnishes nourishment and/or feeds, maintains, and supports the animal ingesting it. The term "nutrient" is intended to include nutritional aids. By "nutritional aid" is meant any substance necessary, advantageous, beneficial to, or enhancing the metabolism and growth of the animal, or any substance which is converted by the animal into a substance necessary, advantageous or beneficial to the metabolism and growth of the animal. Nutrients and nutritional aids can include, without limitation, vitamins (such as, but not limited to, calcium pantothenate), minerals, amino acids (such as, but not limited to, lysine), commercial growth promotants (such as, but not limited to, ionophores (e.g., monensin (e.g., Rumensin™ (Elanco Animal Health, a Division of Eli Lilly and Co.)), lasalocid (e.g., Bovatec™ (Alpharma, Inc.)), salinomycin (Intervet, Inc.), and narasin (Elanco Animal Health, a Division of Eli Lilly and Co.)), enzymes, direct-fed microbials, fermentation coproducts or byproducts, plant products or extracts, and botanicals. By "direct-fed microbial" is meant a composition that includes microbial organisms which are suitable for consumption by the animal, which may include living or dead organisms or not highly purified extracts thereof. By "botanical" is meant a product which consists of vegetable materials, which may include plant materials, algae, macroscopic fungi, or combinations thereof. Although botanicals are isolated from plant materials, they are usually not highly purified or chemically modified. Botanicals are often complex mixtures, and may lack a distinct active ingredient.

The pellets can be added to the animal's overall feed, that is, the pellets can in turn be used as an ingredient in the formulation of an animal feed. Use of the pellets as an ingredient in an animal feed formulation allows more uniform mixing of the pellets (and therefore the nutrients they contain) into the finished animal feed.

Use of the nutrient pellets in an animal feed formulation also avoids some of the disadvantages of adding the nutrients to the feed in powder form. When nutrients are added in powder form, they may not be distributed evenly throughout the mixture, or may be lost due to settling or loss as dust. Feed formulations may therefore need to use larger amounts of the nutrients to make up for the loss. By using the pellets that include nutrients, however, the nutrients are retained evenly in the pellets, and not lost by uneven distribution, settling, or as dust. Smaller amounts of the nutrients can therefore be used in the final feed formulation.

The pellets allow the inclusion of fat and nutrients in the ruminant diet. Adding fat to the diet of a ruminant will normally adversely affect the normal rumen fermentation process, and can prevent the normal breakdown of cellulosic material in the ruminant forestomach. However, adding fat to the ruminant diet also can increase milk production. The pellets therefore allow the fat in the ruminant's diet to be increased without affecting foregut fermentation, because the pellets are durable and are broken down slowly or bypass the ruminant forestomach altogether.

Referring to the flow diagram of FIG. 1, the batching, mixing and pelleting steps can be carried out in the same type of known commercial equipment currently used in the conventional (for example, steam-based) pelleting process. This equipment may be combined in an installation consisting of, for example, and without limitation, a mixer which discharges into a surge bin, which in turn discharges into a pellet mill consisting of a variable-speed feeder, a steam conditioning chamber, and a die/roller assembly. As described herein, the steam conditioning chamber is not used. Mash flows from the feeder through the conditioner, which discharges into the die/roller assembly where the mash is extruded to form pellets. The pellets are then discharged from the pellet roll.

The drying/cooling step also may be carried out using conventional commercial equipment such as a horizontal belt cooler in which the pellets are conveyed onto a moving belt through which air is drawn to cool and dry them. A recent development in coolers is the counterflow cooler in which the air moves in the opposite direction of the pellets. The advantages of this style of cooler are the reduced floor space requirement and reduced air flow needed to achieve good cooling. However, any drying and cooling equipment that can be used in pelleting can be used to produce the pellets described herein.

After drying/cooling, the pellets may be screened to remove the fines (small particles) that result as the pellets are cut at the die and that are generated in the subsequent handling during the drying/cooling process. For some formulations, the fines level may be as high as five to ten percent, or more. These fines may be recycled back to the surge bin where they are fed back into the process along with the unpelleted mash.

Fat-Based Formulation

In formulations where only fat-based ingredients are included in the pellet, the dry salt of fatty acid is preferably batched first and then mixed in a mixer. Then the optional liquefied fats, such as fats, oils, lipids, waxes, etc., are added and mixed. The liquefied fats reduce the loss of dry fat material as dust, and also reduce friction so that the dry salt of fatty acid passes freely through the ring die extruder.

Pellet Formulation Including Nutrients

In formulations where non-fat fortifying ingredients (for example, and without limitation, nutrients such as amino acids and vitamins) are included, the non-fat fortifying ingredients are batched first and mixed in the mixer. Then the liquefied fats, such as fats, oils, greases, waxes, etc., are added and mixed with the non-fat ingredients to form an agglomerated, flowable mixture. Then the dry salt of fatty acid is added and mixed to form the final mash. The premixing of the non-fat fortifying ingredients with the liquefied fats reduces the loss of the dry fortifying ingredients as dust and agglomerates the non-fat fortifying ingredients so that they mix readily with the dry fatty acid salt. In addition, the premixing of the fortifying ingredients with the liquefiable fats also serves to reduce the later loss of the fortifying ingredients from the surface of the pellet, when the pellets are used in animal feed formulations where the pellet serves as an imbedded matrix barrier to penetration by microorganisms in the rumen.

In formulations where non-fat ingredients are included, final pellet quality will be determined primarily by the interaction of the respective levels of the dry salt of fatty acid and the physical properties of the non-fat ingredients in the mixture. In these applications, dry salt of fatty acid should preferably make up between 50 to 99%, more preferably 70 to 95%, and most preferably about 85% of the total weight of the ingredients. In the preferred embodiment of the invention, the non-fat ingredients are premixed with the liquefiable fats; correspondingly, the quality of the pellet can be affected by the melting point of the liquefiable fats included in the mixture. In these applications, it is preferred that the individual fats or fat blends, have melting points preferably between −20 to 80° C., more preferably between 30 to 70° C., and most preferably between 45 to 65° C.

In conventional pelleting processes, conditioning of the meal or mash with steam is performed prior to the compression of the meal or mash into pellets. Heat and water from the steam serve to activate binders in the mash particles (for example, and without limitation, proteins and carbohydrates), soften them and bring cohesive properties onto the surfaces of the particles, and to provide lubrication for the die. When the mash is compressed through a die, the particles are compacted and stick together to form pellets.

In the present process, in contrast, no steam conditioning is used prior to compression of the mash through a die to form the pellets. The calcium salt of fatty acid in the pellet is crystalline in nature.

The preferred range for the most reliable practice of the process of the invention is assessed by measuring the pellet durability index (PDI) of the finished fat-based pellets. The durability of finished pellets is determined according to the procedure set forth in ASAE Standard S269.4 (2003) using the apparatus specified therein. The PDI value equals the percentage by weight of the pellets surviving the test.

Other methods for evaluating the quality of pellets are known in the art, such as by testing the hardness of a pellet by use of a tablet hardness tester (for example, but not limited to, the model VK 200 available from Varian, Inc., Palo Alto, Calif., USA; model ZHU available from Zwick/Roell, Atlanta, Ga., USA; the Holman Pellet Tester, Holman Chemical Ltd, UK; and others). A tablet hardness tester evaluates the hardness of a tablet or pellet, which often correlates with its durability.

The pellets also can be evaluated for rumen stability, that is, they can be tested in the rumen of the animal, as is done in Example 3, below.

EXAMPLES

Example 1

All-Fat Animal Feed Pellets

TABLE 1

Formula for all-fat animal feed pellets

| | % By Weight* |
|---|---|
| Calcium salt of fatty acid | 99.0 |
| Soybean oil | 1.0 |

*Unless otherwise indicated, all percentages listed are weight percentages of the total mixture (mash) to be pelleted.

Mixing: Calcium salt of palm oil fatty acid and hydrogenated soybean oil were batched and mixed sufficiently to achieve a substantially uniform mix. A dry but non-dusty, cohesive mash was obtained at end of the final mixing.

Pelleting: After mixing, the mash was delivered to the pellet mill feeder through a bypass of the surge bin above the pellet mill. The mash was fed into the pellet mill conditioning chamber and then to the roller and die extruder. Steam was not added and no mash conditioning was involved. When the mash was compacted through the die, hard, highly-cohesive pellets were formed that had a waxy appearance. The extruded pellets had a temperature of 175° F. The pellets were cooled in a cooler.

Example 2

Predominantly Fat Animal Feed Pellets Including an Amino Acid

A test was conducted to determine whether the process of this invention would accommodate the inclusion of a significant level of a non-fat ingredient into the base, all-fat mash mixture.

TABLE 2

Formulas for predominantly fat animal feed pellets including an amino acid

| Formula | Calcium salt of fatty acid, percentage by weight | Source and percentage by weight of liquefiable conditioner | Lysine-HCl, percentage by weight | Pellet durability index |
|---|---|---|---|---|
| 1 | 78 | 2% soybean oil | 20 | 95 |
| 2 | 78 | 2% lecithin | 20 | 91 |
| 3 | 78 | 2% petrolatum | 20 | 94 |
| 4 | 78 | 2% wax | 20 | 95 |
| 5 | 76 | 4% wax | 20 | 99 |

Mixing: The amino acid lysine hydrochloride was used. The lysine hydrochloride and the liquefied fat in each of the above formulas were batched and premixed in the mixer for two minutes. The calcium salt of fatty acid was then added and mixed sufficiently to achieve a substantially uniform mix. A dry but non-dusty mixture was obtained at the end of the final mixing.

Pelleting: After mixing, the mash was delivered to the pellet mill feeder through a bypass of the surge bin above the pellet mill. The mash was fed into the pellet mill conditioning chamber and then to the roller and die extruder. Steam was not added and no mash conditioning was involved. When the mash was compacted through the die, hard pellets were formed that had a waxy appearance. Although cohesiveness of the pellets was good, a small amount of pellet fines were observed. The extruded pellets had a temperature of 145 to 153° F. The pellets were cooled to ambient temperature.

The final cooled pellets had a pellet durability index (PDI) that ranged between 95 and 99 percent. All of these PDI values are considered very good for these formulas considering the level of added fat.

Example 3

Rumen-Stable, Imbedded Amino Acid and Vitamin Pellets

A test was conducted to determine whether the process could be used to fabricate a fat pellet with limited solubility in the rumen. Such a pellet could be used to protect feed microingredients from degradation by microflora in this digestive compartment. The amino acid lysine hydrochloride and the vitamin calcium pantothenate were used as examples because these micronutrients are known to be less efficiently utilized by a ruminant animal when fed in an unprotected form.

TABLE 3

Formulas for rumen-stable, imbedded amino acid and vitamin pellets

| Pellet Formula | Pellet Formula Composition, % | | | | Stability of non-fat microingredients in the rumen | |
|---|---|---|---|---|---|---|
| | Fat sources | | Non-fat ingredients | | | Non-fat |
| | Calcium salt of fatty acid | Soybean oil | Lysine hydrochloride | Calcium pantothenate | Hours of in situ incubation | ingredient remaining, % |
| Amino acid | 79 | 1 | 20 | 0 | 4 | 33.2 |
| Amino acid | 79 | 1 | 20 | 0 | 8 | 24.4 |
| Amino acid | 79 | 1 | 20 | 0 | 16 | 13.1 |
| Vitamin | 94 | 1 | 0 | 5 | 4 | 55.7 |
| Vitamin | 94 | 1 | 0 | 5 | 8 | 49.1 |
| Vitamin | 94 | 1 | 0 | 5 | 16 | 38.1 |

Mixing: All of the ingredients in each of the above formulas were batched and added to the mixer and then mixed sufficiently to achieve a substantially uniform mix. A dry but non-dusty, cohesive mash was obtained at end of the final mixing.

Pelleting: After mixing, the mash was delivered to the pellet mill feeder through a bypass of the surge bin above the pellet mill. The mash was fed into the pellet mill conditioning chamber and then to the roller and die extruder. Steam was not added and no mash conditioning was involved. When the mash was compacted through the die, hard pellets were formed that had a waxy appearance. Although cohesiveness of the pellets from all formulas was good, the amount of pellet fines observed and the softness of the pellets was increased as the level of non-fat ingredients in the formula was increased. The extruded pellets had a temperature of 145 to 153° F. The pellets were cooled to ambient temperature.

In Situ Evaluation of the Non-fat Ingredient Stability in the Rumen: To measure the in situ stability of the microingredients within the microbial environment of the rumen, samples of the cooled pellets from each formula were weighed and placed in semi-permeable, dacron bags and suspended in the forestomach of an adult cow for varying lengths of time. Imbedding the nutrients in the cohesive matrix of the fat pellet was determined to afford a level of protection against solubilization and degradation of the ingredient in the ruminant forestomach. By four hours of incubation in the rumen, 33.2% of the lysine source remained in the bags and 55.7% of the pantothenic acid source. In their free chemical form, neither of these microingredients would remain at detectable levels in the rumen compartment by four hours after feeding the animal.

Example 4

Palatability of High Fat Feed Pellets

This trial compared intake of calcium salts of fatty acids, in meal and pelleted forms, in two diet regimens, namely, growing dairy-beef cattle and lactating dairy cattle.

The composition, nutrient composition and nutrient specifications of the pellets are provided in Tables 4, 5 and 6, below.

TABLE 4

Composition of pellets

| Ingredients | Percent by Weight |
|---|---|
| Calcium Salts of Fatty Acids | 97.00 |
| Calcium Carbonate | 2.00 |
| Soy Oil | 1.00 |
| Total | 100.00 |

TABLE 5

Nutrient composition of pellets

| Nutrient | Unit, Dry Matter Basis |
|---|---|
| Dry Matter | 99.49% |
| Moisture | 0.51% |
| Fat; Crude | 81.44% |
| NFC-Calc | 7.80% |
| NE: Lactation | 2.91 MC/LB |
| Calcium | 9.36% |
| Calcium, Antibodies | 5.62% |
| Iron | 6.03 PPM |

TABLE 6

Nutrient specification of pellets

| Nutrient | Unit, Dry Matter Basis |
|---|---|
| Dry Matter | 98.00% |
| Moisture | 2.00% |
| Fat; Crude | 86.22% |
| RDP | 100.00% |
| NE: Lactation | 2.35 MC/LB |
| Calcium | 9.20% |
| Ash | 11.22% |
| TDN | 185.00% |
| Bypass Fat, Added | 86.22% |

The diets fed to the animals are listed in Table 7, below. The nutrient content of the diets is provided in Table 8, below.

TABLE 7

Composition of diets fed to dairy-beef cattle and lactating dairy cattle

| Ingredients, % As Fed | Dairy-Beef Cattle Diet | % Dry Matter | Lactating Dairy Cattle Diet | % Dry Matter |
|---|---|---|---|---|
| Corn Grain Cracked | 38.69 | 38.69 | | |
| Bovagain G38 | 4.83 | 4.83 | | |
| Cottonseed Hulls | 21.98 | 21.98 | 2.00 | 3.45 |
| Wheat Middlings | 11.24 | 11.24 | | |
| Distillers Gr + Soluble | 23.27 | 23.27 | | |
| Alfalfa Hay | | | 6.00 | 10.25 |
| Hay Pellets | | | 2.50 | 4.22 |
| Corn Silage | | | 61.02 | 33.91 |
| DFP 8508 DDG Balancer | | | 15.01 | 25.02 |
| DFP 8509 Soy Protein | | | 8.47 | 14.68 |
| Energy Blend | | | 4.00 | 6.61 |
| High Fat Pellets | | | 1.00 | 1.86 |
| Total | | | 100.00 | 100.00 |

TABLE 8

Nutrient content of diets fed to dairy-beef cattle and lactating dairy cattle

| Nutrient | Dairy-Beef Cattle TMR As Fed | Dry Matter Basis | Lactating Dairy Cattle TMR As Fed | Dry Matter Basis |
|---|---|---|---|---|
| Dry Matter | | 89.57% | | 52.73% |
| Protein | 14.06% | 15.70% | 8.96% | 17.00% |
| NE: Gain | 0.47 MC/LB | 0.53 MC/LB | 0.17 MC/LB | 0.32 MC/LB |
| NE: Maint | 0.76 MC/LB | 0.86 MC/LB | 0.27 MC/LB | 0.52 MC/LB |
| ADF (acid detergent fiber) | 21.36% | 23.85% | 12.45% | 23.62% |
| NDF (neutral detergent fiber) | 36.10% | 40.30% | 19.15% | 36.31% |
| TDN (Total digestible nutrients) | 67.67% | 75.55% | 40.82% | 77.42% |
| NFC (non-fiber carbohydrate) | 32.47% | 36.25% | 19.45% | 36.88% |
| Vitamin A | 1671.34 IU/LB | 1865.96 IU/LB | 1598.17 IU/LB | 3030.86 IU/LB |
| Vitamin D | 131.32 IU/LB | 146.61 IU/LB | 426.18 IU/LB | 808.23 IU/LB |
| Vitamin E | 9.36 IU/LB | 10.51 IU/LB | 13.50 IU/LB | 25.61 IU/LB |
| Salt | 0.38% | 0.42% | 0.13% | 0.25% |
| Calcium | 0.41% | 0.46% | 0.54% | 1.03% |
| Phosphorus | 0.44% | 0.49% | 0.19% | 0.36% |
| Potassium | 0.76% | 0.85% | 0.62% | 1.18% |
| Sulfur | 0.17% | 0.19% | 0.12% | 0.22% |
| Magnesium | 0.16% | 0.18% | 0.14% | 0.26% |
| Ca:P Ratio | 0.83% | 0.93% | 1.53% | 2.90% |
| Fat | 4.33% | 4.83% | 2.90% | 5.50% |
| Fiber | 14.64% | 16.35% | 9.41% | 17.84% |

The dairy-beef diet was fed to eight Holstein steers weighing 700-800 pounds. The lactating total mixed ration (TMR) was fed to cows whose pre-trial dry matter intakes were between 20 and 26 kg.

The lactating dairy cattle and dairy-beef cattle were fed their normal TMR ration for 5-7 days to determine their ad libitum feeding level. One day prior to feeding CSFA, feed intake was reduced to 90% of ad libitum level and maintained throughout feeding CSFA. Each day, prior to feeding, one pound of CFSA in pelleted and meal form was presented and the intake and preference of each form after 15 minutes was recorded. Each supplement form was weighed back and the TMR then was presented to the animals. Each day, any TMR left over from the previous day was weighed back and the process repeated.

The lactating ration in Table 8 was presented with one pound of CSFA included in the diet. Cows were allotted based on daily dry matter intake (DMI) and milk production to a form of CSFA. Total feed intake was monitored with daily weigh backs. After feeding a form of CSFA for 7 days, the forms were switched and feed intake was monitored for 7 additional days.

Milk production and feed intake for lactating dairy cattle are shown in Table 9, below.

TABLE 9

Milk production (lbs) by lactating dairy cows fed diets containing CSFA in meal or pellet form

| Animal No. | Group | Meal | Pellet |
|---|---|---|---|
| 49 | 1 | 81.9 | 86.1 |
| 74 | 1 | 78.1 | 80.5 |
| 1870 | 1 | 52.5 | 52.5 |
| 2996 | 1 | 68.7 | 69.6 |
| 4477 | 1 | 68.0 | 70.6 |
| Average | 1 | 69.8 | 71.9 |
| 1871 | 2 | 81.0 | 82.5 |
| 2858 | 2 | 66.1 | 67.0 |
| 2967 | 2 | 65.5 | 68.7 |
| 2973 | 2 | 57.4 | 54.8 |
| 4545 | 2 | 102.8 | 100.9 |
| Average | 2 | 74.6 | 74.8 |
| Overall Average | | 72.2 | 73.3 |

Difference P = 0.8642; Std. Er. = 6.32

For lactating dairy cattle, the average feed intake (in pounds) was 80.6 lbs. for the CSFA in meal form, and 82.4 lbs. for the pelleted form, with a standard error of 0.04 and p=0.7035.

CSFA intake and choice preference by dairy-beef cattle within 15 minutes were greater for the CSFA in pelleted rather than meal form. Data were analyzed using pair-wise comparison of Proc Mix analysis by treatment within feeding regimen. P<0.10 was declared significant unless otherwise noted. The steers choice determination was declared each time an animal ate more of one form of the CSFA over the other. The average supplement intake (in pounds) for beef cattle was 0.26 lbs. for the CSFA in meal form, and 0.38 lbs. for the pelleted form (standard error 0.04; P=0.0028). The frequency of steer choice for the pelleted form was 20 for the meal form, and 36 for the pelleted form of supplement (chi-sq.=4.57; P=0.0325). Over 24 hours, steer supplement intake was 0.59 lbs for meal, and 0.64 lbs. for pellets (standard error=0.05; P=0.2793), and choice frequency over 24 hours was 22 for meal and 28 for pellets (chi-sq.=0.72; P=0.3961; 6 observations missing).

These data indicate a numeric trend for improved feed intake for lactating dairy cows fed TMR with pelleted CSFA versus meal form. This numeric trend also extended to milk production by those animals because lactating dairy cows fed the pelleted form produced 1.1 lbs. more milk than cows fed the meal form. Dairy-beef steers given the choice of pelleted or meal CSFA consumed more (0.38 lb to 0.26 lb; P<0.05) of the pelleted form in the first 15 minutes in the programmed feeding regimen. This also translated to an increased choice for the pelleted form of CSFA (36 to 20 observations; P<0.05). This carried into similar numeric trends for consumption and for choice over a 24-hour period.

The data indicate that, given a choice, dairy-beef steers prefer the pelleted form of CSFA. Lactating dairy cattle fed TMR containing pelleted CSFA tended to consume more feed and had numerically better milk yield compared with when the TMR contained CSFA in meal form. Pelleting the CSFA therefore improves its intake when presented to ruminants.

While this invention has been particularly shown and described with references to preferred embodiments thereof, it will be understood by those skilled in the art that various changes in form and details may be made therein without departing from the scope of the invention encompassed by the appended claims.

What is claimed is:

1. A pellet made by a process comprising:
combining a calcium salt of a fatty acid and a vegetable oil to form a mixture comprising between 50% and 99% by weight of the calcium salt of the fatty acid and 1% to 5% by weight of the vegetable oil; and
pelleting the mixture without steam conditioning such that the pellet has a pellet durability index (PDI) of greater than 80 percent as determined by American Society of Agricultural Engineers Standard S269.4 (2003) and the calcium salt of the fatty acid is crystalline in the pellet.

2. The pellet made by the process of claim 1, the process further comprising combining an amino acid with the calcium salt of the fatty acid and the vegetable oil to form a mixture comprising between 71% and 84% by weight of the calcium salt of the fatty acid, and between 1% and 4% by weight of the vegetable oil, and between 15% and 25% by weight of the amino acid.

3. The pellet made by the process of claim 1, the process further comprising combining a vitamin with the calcium salt of the fatty acid and the vegetable oil to form a mixture comprising between 86% and 98% by weight of the calcium salt of the fatty acid, and between 1% and 4% by weight of the vegetable oil, and between 1% and 10% by weight of the vitamin.

4. A high-fat ruminant feed pellet, wherein the pellet comprises:
between 50% and 99% by weight of a calcium salt of a palm oil fatty acid in a crystalline form; and
1% to 5% by weight of a vegetable oil;
wherein the pellet has a pellet durability index (PDI) of greater than 80 percent as determined by American Society of Agricultural Engineers Standard 5269.4 (2003).

5. The high-fat ruminant feed pellet of claim 4, wherein the mixture further comprises a nutrient.

6. The high-fat ruminant feed pellet of claim 5, wherein the nutrient is selected from the group consisting of an amino acid, a vitamin, a mineral, a commercial growth promotant, an enzyme, a direct-fed microbial, a fermentation coproduct or byproduct, a plant extract and a botanical.

7. The high-fat ruminant feed pellet of claim 6, wherein the amino acid is lysine.

8. The high-fat ruminant feed pellet of claim 7, wherein greater than 20% of the amino acid within the pellet remains in the gut of a ruminant animal four hours after the animal has ingested the pellets.

9. The high-fat ruminant feed pellet of claim 7, wherein greater than 40% of the amino acid within the pellet remains in the gut of a ruminant animal four hours after the animal has ingested the pellets.

10. The high-fat ruminant feed pellet of claim 4, further comprising:
between 15% and 25% by weight of an amino acid.

11. The high-fat ruminant feed pellet of claim 4, further comprising:
between 1% and 10% by weight of a vitamin.

12. A pellet made by a process comprising:
pelleting a calcium salt of a palm oil fatty acid in crystalline form and a liquefiable conditioner without steam conditioning, thus forming a pellet comprising between 70% and 95% of the calcium salt of the palm oil fatty acid;
wherein the pellet has a pellet durability index (PDI) of greater than 80 percent as determined by American Society of Agricultural Engineers Standard S269.4 (2003) and the calcium salt of the fatty acid is crystalline in the pellet.

13. The pellet made by the process of claim 12, further comprising:
combining a nutrient with the calcium salt of the palm oil fatty acid to form the mixture.

14. The pellet produced by the process of claim 1, the mixture further comprising a nutrient selected from the group consisting of an amino acid, a vitamin, a mineral, a commercial growth promotant, an enzyme, a direct-fed microbial, a fermentation coproduct or byproduct, a plant extract, a botanical and combinations of any thereof.

15. The high-fat ruminant feed pellet of claim 4, further comprising a direct-fed microbial.

16. The high-fat ruminant feed pellet of claim 4, wherein the pellet consists of the calcium salt of the palm oil fatty acid and the vegetable oil.

17. The pellet of claim 12, further comprising a direct-fed microbial.

* * * * *